No. 666,725. Patented Jan. 29, 1901.
R. S. WOODRUFF.
RUBBER TIRE FOR VEHICLE WHEELS.
(Application filed Nov. 14, 1900.)
(No Model.)
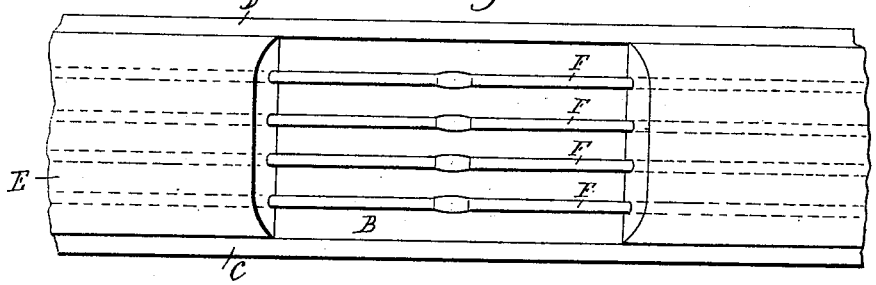
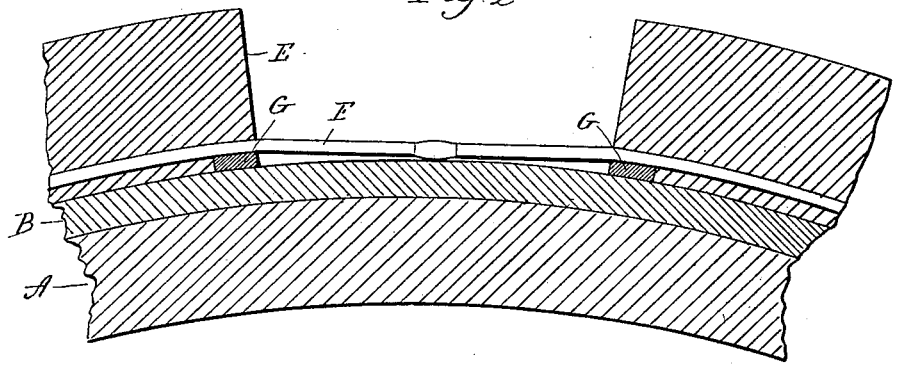
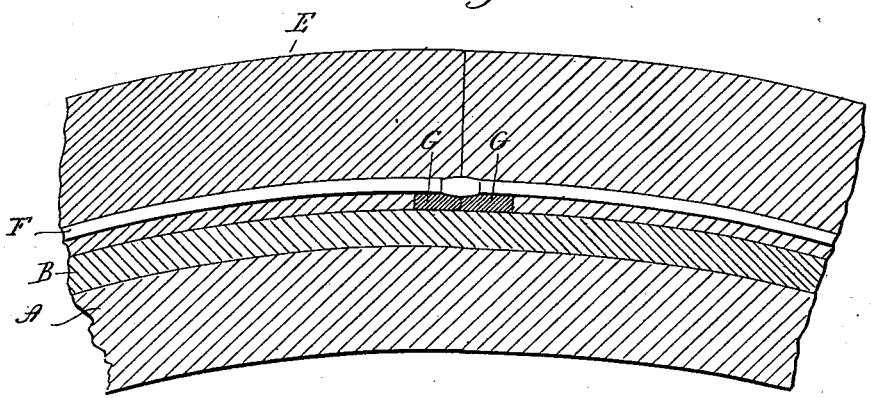

UNITED STATES PATENT OFFICE.

ROLLIN S. WOODRUFF, OF NEW HAVEN, CONNECTICUT.

RUBBER TIRE FOR VEHICLE-WHEELS.

SPECIFICATION forming part of Letters Patent No. 666,725, dated January 29, 1901.

Application filed November 14, 1900. Serial No. 36,488. (No model.)

*To all whom it may concern:*

Be it known that I, ROLLIN S. WOODRUFF, of New Haven, in the county of New Haven and State of Connecticut, have invented a new Improvement in Rubber Tires for Vehicle-Wheels; and I do hereby declare the following, when taken in connection with the accompanying drawings and the letters of reference marked thereon, to be a full, clear, and exact description of the same, and which said drawings constitute a part of this specification, and represent, in—

Figure 1, a broken top view of a wheel-rim with a tire thereon, the ends of the tire separated to show the connecting-wires therein; Fig. 2, a longitudinal sectional view showing the same parts; Fig. 3, a sectional view showing the ends of the tire united.

This invention relates to an improvement in rubber tires for vehicle-wheels, and particularly to that class of wheels which are adapted for comparatively heavy use and in which a solid tire is employed, and more particularly to that class in which the tires are secured within a metal channel or groove by means of annular bands of wire extending through the tire.

One method of securing tires to the rims is to force back the rubber tire upon the securing-wires, so that the ends of the wires are exposed between the ends of the tire. These ends are placed under tension and their ends secured by soldering or other means and then the ends of the tire released, allowing them to come together and be cemented. In giving the wires proper tension, however, between the ends of the rubber tire they are drawn into nearly a straight line, and hence lie very close to the rim and so that when the ends of the tires are released and come together they fail to lift the wires from the rim, and therefore that portion of the tire below the wires is cut away or torn, leaving a weak spot at this point.

The object of this invention is to overcome this difficulty; and it consists in arranging a hard substance below the wires at one or both ends of the wire, which in passing beneath the wires as the ends of the tire come together will raise the wires and prevent their cutting the tire, and in further details of construction and combinations of parts, as will be hereinafter described, and particularly recited in the claims.

A represents the usual rim of a wheel, and B a metal tire arranged thereon and having flanges C D, forming a groove, within which the rubber tire is arranged in the usual manner.

As shown in Fig. 1 of the drawings, the rubber tire E is secured by four wires F, which extend throughout the tire, which may be of any approved form, but preferably having a flat lower face. Into the lower face of one or both ends of the tire I arrange a plate or block G of hard rubber, fiber, metal, or other suitable material, and these blocks are so located that the wires F will rest or bear upon them. The tire thus formed is placed in the groove or channel B in the usual manner and the ends forced back, so as to expose the ends of the wires between them, and these wires are drawn together under great pressure and their ends united either by electric welding or other suitable joint. In thus drawing and joining the wires between the ends of the tire the wires naturally stand in a straight line between the ends of the tire, as shown in Fig. 2, and hence their centers lie close to or upon the face of the groove or channel B. After the wires are thus connected the ends of the tire are released and allowed to spring or be drawn together and their ends cemented. In thus coming together the blocks G raise the wires F into line with the openings in the tire, as shown in Fig. 3, and therefore prevent the wires from cutting away the portion of the rubber tire below the openings through which the wires extend. It will be understood that if the wires F are connected by electric welding the blocks G should be of hard rubber, fiber, or other non-conductor of electricity. It is also evident that in some cases a block arranged in one end of the tire will be sufficient; but preferably a block will be arranged at both ends.

By the term "wires" as herein used it will be understood that either round wires may be employed, as shown, or flat bands and that the tire may be solid or of the so-called "cushion" type. I therefore do not wish to be understood as limiting the invention to the exact forms shown; but, Having fully described my invention, what

I claim as new, and desire to secure by Letters Patent, is—

1. The combination with a rubber tire for vehicle-wheels and the wires extending therethrough and by which it is secured in position, of a block mounted in one end of the tire below the said wires and upon which the wires may rest, substantially as described.

2. The combination with a rubber tire for vehicle-wheels and the wires extending therethrough and by which it is secured in position, of blocks mounted in the ends of the tire below the said wires, and upon which the wires may rest, substantially as described.

3. The combination with a wheel-rim and groove or channel thereon, of a rubber tire having wires extending therethrough, and by which the tire is secured in the channel, of blocks of harder substance than the tire arranged in the ends of the tire below the wires therein, and upon which the wires rest, substantially as described.

In testimony whereof I have signed this specification in the presence of two subscribing witnesses.

ROLLIN S. WOODRUFF.

Witnesses:
GEORGE D. SEYMOUR,
FRED C. EARLE.